United States Patent

Jacobsen

[15] 3,643,816
[45] Feb. 22, 1972

[54] STACKER FOR BAGS AND THE LIKE

[72] Inventor: Paul W. Jacobsen, Kiel, Wis.
[73] Assignee: H. G. Weber and Company, Inc., Kiel, Wis.
[22] Filed: May 25, 1970
[21] Appl. No.: 40,317

[52] U.S. Cl. ............................................. 214/6 H, 271/88
[51] Int. Cl. ..................................................... B65g 57/03
[58] Field of Search ....................... 214/6 H, 6 K, 6 FA, 6 D;
271/88, 68; 93/93.3

[56] References Cited

UNITED STATES PATENTS

| | | | |
|---|---|---|---|
| 3,532,230 | 10/1970 | Gutberlet et al. | 214/6 H |
| 2,825,475 | 4/1958 | Roberts | 214/6 H |
| 2,413,979 | 1/1947 | Lamb | 214/6 H X |
| 3,418,895 | 12/1968 | Palmer | 93/93.3 |
| 3,548,995 | 12/1970 | Oderman et al. | 271/88 X |

*Primary Examiner*—Albert J. Makay
*Assistant Examiner*—Robert J. Spar
*Attorney*—Hill, Sherman, Meroni, Gross & Simpson

[57] ABSTRACT

Counter and stacker for flat articles such as paper bags and the like. The stacker includes a frame having laterally spaced vertically extending side guides, which may be adjusted to converge towards each other at their lower ends. Conveyor chains move downwardly along the guides. The chains have spaced flights extending horizontally therefrom towards each other, with the flights extending from opposite chains registering with each other during downward travel of the flights to provide separated downwardly movable platforms spaced along the chains. The chains are driven by a Geneva drive mechanism to provide dwells in downward travel of the flights to accelerate and decelerate the flights and establish a series of holding areas during the periods of dwell, and to advance the flights downwardly ahead of the articles stacked at accelerated speeds when initially traveling from a holding station. The stacker is driven by the bag machine at a speed related to the delivery speed of the bag machine to effect the stacking of a preselected number of bags and to thereby count the bags stacked. The speed of the stacker may be varied in accordance with the size of stacks selected.

10 Claims, 8 Drawing Figures

INVENTOR.
Paul W. Jacobsen

STACKER FOR BAGS AND THE LIKE

SUMMARY AND OBJECTS OF THE INVENTION

Stacker for flat articles, such as bags or sacks at the delivery end of a bag making machine eliminating the manual labor in handling the bags, and collecting heretofore required, and counting and stacking the bags, determined by the speed of delivery of bags to the stacker and lowering movement of the stacked bags and the spacing of the support flights for the bags.

A principal object of the present invention is to provide a novel and improved form of stacker for flat articles, such as bags arranged with a view toward eliminating the manual labor heretofore required to handle the bags at the delivery end of the bag machine and to materially increase the speed of the bag stacking operation.

Another object of the invention is to provide a simplified vertical stacker for flat articles, such as paper bags or sacks by providing spaced vertically extending guides and guiding endless chains to move downwardly along said guides and intermittently moving registering flights extending from opposite endless chains downwardly along the guides at accelerated rates of speed and greater than the rates of delivery of bags to the stacker, and consolidating the bags in the stacks during periods of dwell in downward travel of the flights.

A further object of the invention is to improve upon the stacking of bags delivered from the bag machine operating on principles of stacking the bags in stacks of preselected heights, determined by the delivery speed of the bag machine, by providing a series of vertically spaced downwardly moving flights providing platforms for supporting the bags and moving the flights downwardly with intermittent periods of acceleration and deceleration with dwells in downward movement of the flights driven by a mechanism driven from the bag machine, to relate stacking of the bags to the delivery speed of the bag machine.

Another object of the invention is to provide a simple and improved apparatus for counting and stacking flat articles, in which change speed gearing in the drive to the apparatus determines the count of articles stacked.

Still a further object of the invention is to provide an apparatus for stacking flat articles including side guides and vertically spaced horizontal flights movable downwardly along said guides, in which primary and secondary holding areas are provided and determined by periods of dwell in downward travel of the flights, to effect collection of the bags at the primary holding area and let the stack settle into a solid mass at the secondary holding area and to trim the stack as entering the secondary holding area.

A still further object of the invention is to provide a stacker for paper bags and the like, collecting, counting and stacking bags, in which the bags are counted by a change speed gear train, in which selected speeds determine the number of bags in the stacks.

Still another object of the invention is to provide a simplified apparatus for stacking paper bags, in which bags are collected and stacked and are dressed as falling from a holding area, by converging side guides for the stack.

Other objects, features and advantages of the invention will be readily apparent form the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 4 is a partial fragmentary detail plan view of one of the side guides drawn to a reduced scale and showing the chains and flights traveling downwardly along the guides.

FIG. 5 is an end view of one of the side guides drawn to substantially the same scale as FIG. 4.

FIG. 6 is a schematic view illustrating the drive from the bag machine to the bag stacker.

DESCRIPTION OF THE PREFERRED EMBODIMENT OF THE INVENTION

Figure 1:
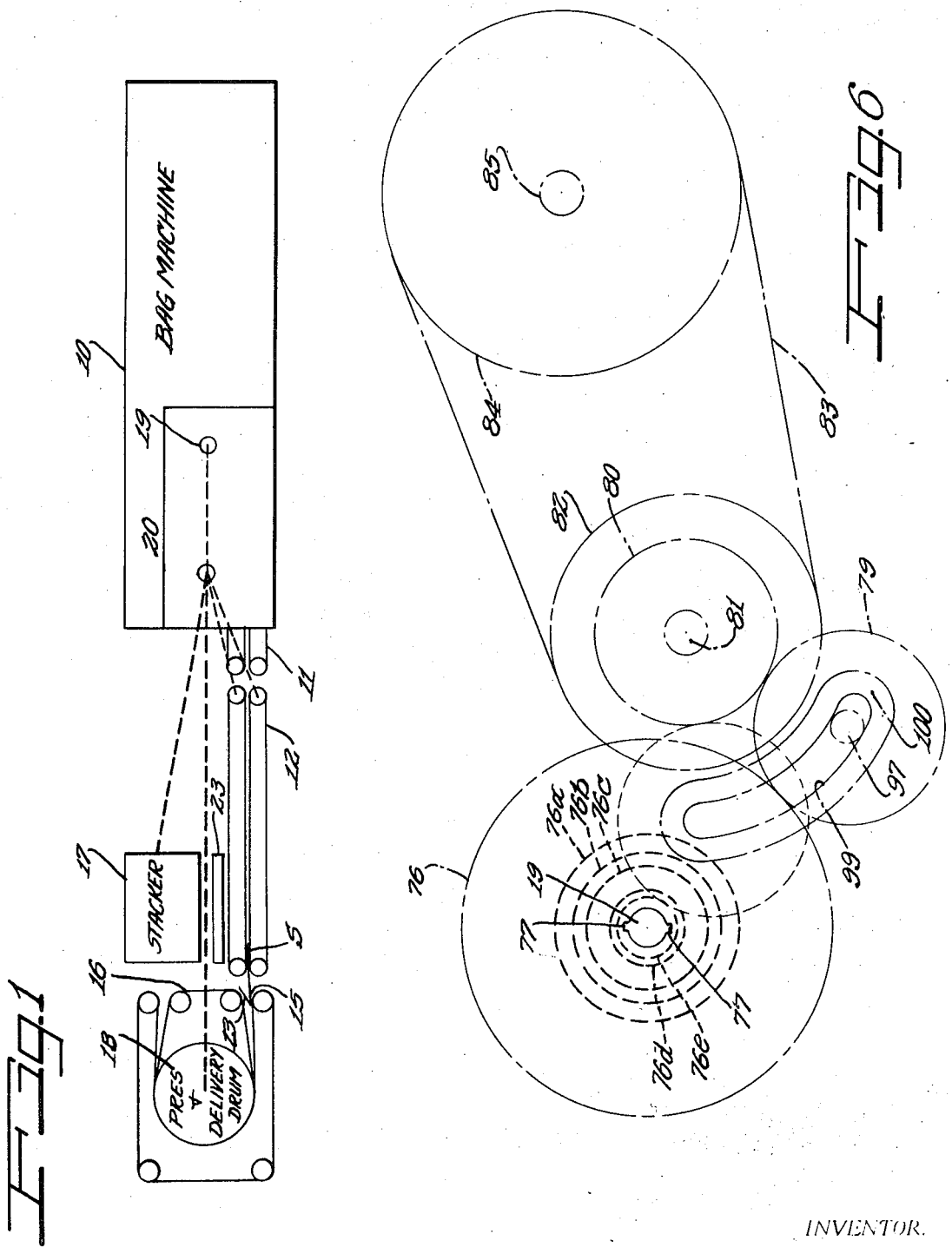
FIG. 1 is a diagrammatic view schematically showing a bag machine, a press and delivery drum and a bag stacker between the bag machine and press and delivery drum for receiving bags delivered from the bag machine.

In FIG. 1 of the drawings, I have schematically shown in block form a bag machine 10 for making paper bags. The bag machine has a pair of vertically spaced conveyors 11 leading therefrom, discharging sacks or bags S from the space between said conveyors to the space between two transfer conveyors 12. I have also shown a press and delivery drum 13 including conveyor belts 15 and 16 trained about said drum 13 and in bag receiving relation with respect to the conveyors 12 and in bag discharge relation with respect to a stacker 17. The press and delivery drum 13 and conveyor belts 15 and 16 successively take the bags or sacks discharged from the bag machine and conveyor belts 11 and 12 and press and invert the bags so the upwardly facing folded bottoms B of the bags as delivered from the bag machine face downwardly to thereby avoid interference between the bags delivered one on top of the other to the stacker 17.

The bag machine 10, conveyors 11 and 12 and conveyor belts 15 and 16 and press and delivery drum 13 may be of constructions well known to those skilled in the art, so need not herein be shown or described in detail, except to point out that the bag machine has a drive shaft 19 extending from one side thereof and driving a transmission 20 including a series of change speed gears, which will hereinafter be more clearly described as this specification proceeds.

Figure 2:
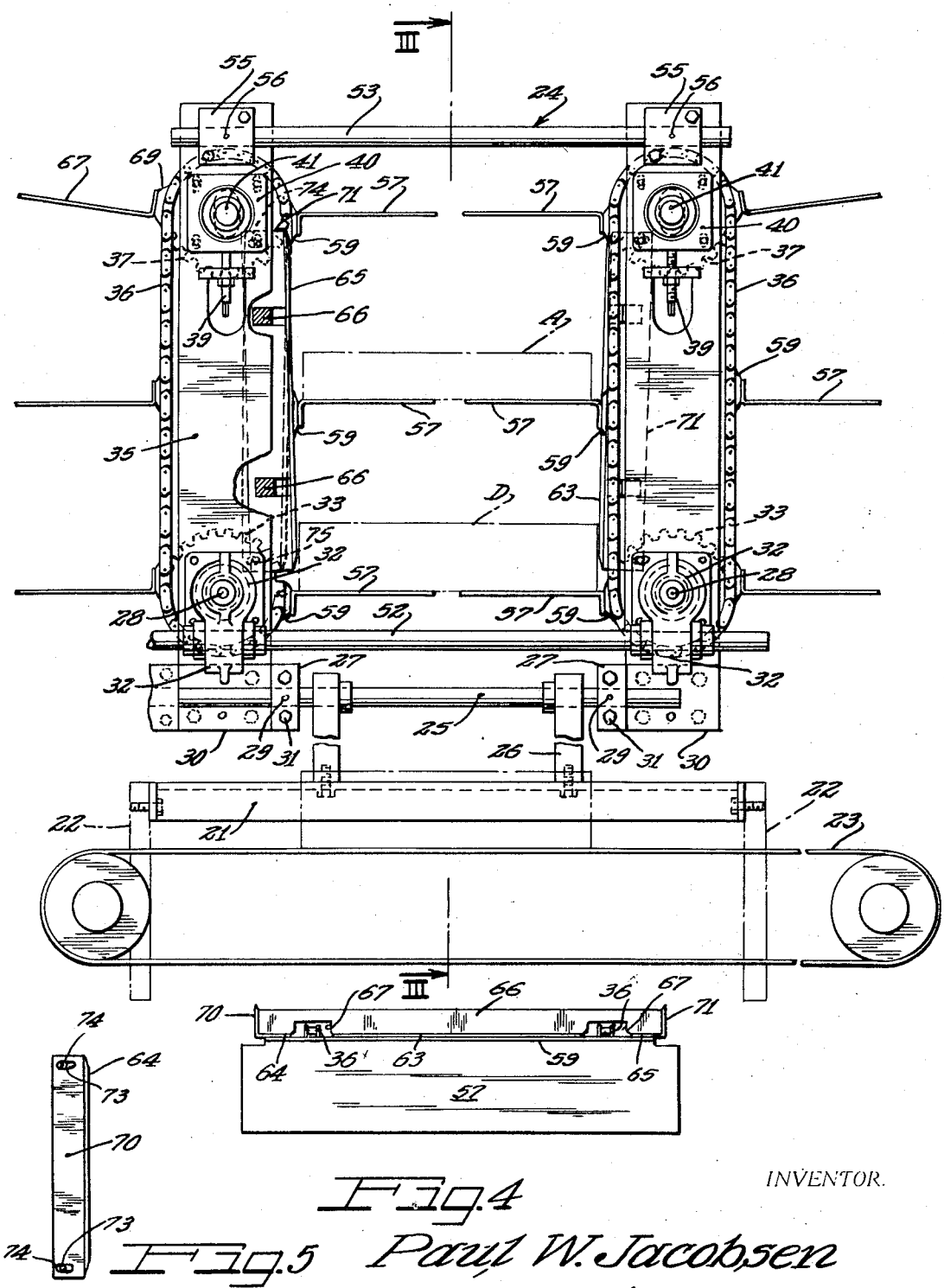
FIG. 2 is a front end view of the bag stacker, with certain parts broken away and certain other parts shown in section in order to illustrate certain details of the stacker and operation thereof.
Figure 3:
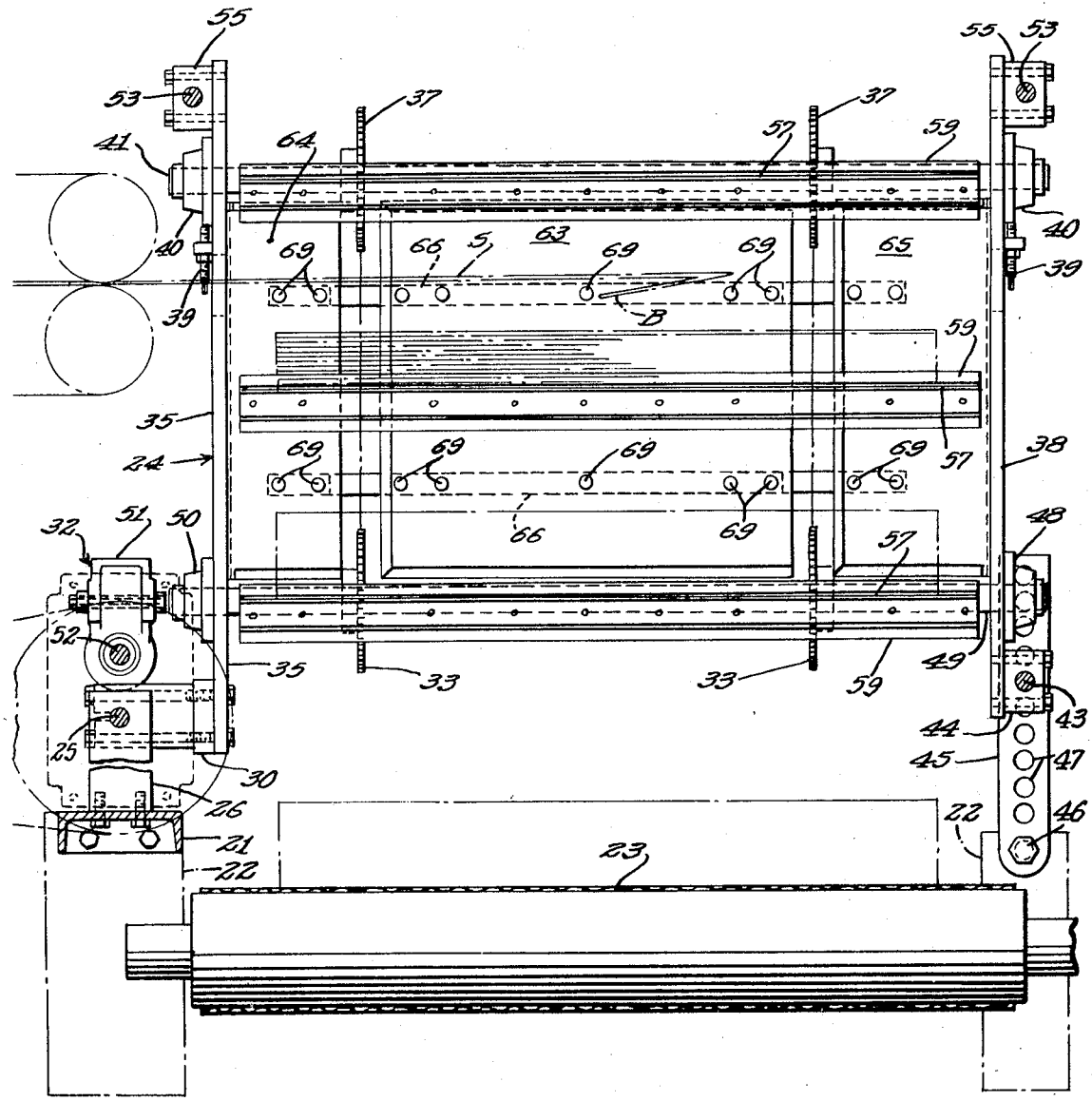
FIG. 3 is a sectional view of the bag stacker taken substantially along line III—III of FIG. 2 with certain parts removed.

The stacker 17 includes a base frame 21 supported in elevated relation with respect to the ground on standards 22 extending along opposite sides of a carry out conveyor 23. A laterally adjustable stacker frame 24 is mounted on the base frame 21 for tilting movement about one end thereof, about the axis of a horizontal shaft 25. As shown in FIG. 2, the shaft 25 is pivotally mounted on the base frame 21 on upright standards 26, secured to and extending upwardly of said base frame, and is clamped adjacent its opposite ends to blocks 27 as by setscrews 29. This accommodates adjustment of the stacker frame 24 in accordance with the width of bags stacked. The mounting blocks 27 are in turn bolted to mounting blocks 30 as by bolts 31, which form supports for right angled drives 32,32 and parallel shafts 28 driven by said drives. The drive shafts 28 each have a pair of drive sprockets 33 spaced longitudinally therealong for driving conveyor chains 36,36. Support plates 35,35 are disposed adjacent opposite ends of the shafts 28 and extend upwardly of the right angled drives 32 and form supports at their upper ends for shafts 41 and idler sprockets 37,37 on said shafts. The shafts 41 and idler sprockets are adjustable to maintain the chains 36 under the proper tension by suitable takeup mechanisms 39,39 having adjustable connection with bearing boxes 40 for said shafts 41. The takeup mechanisms 39 are shown as being screw types of takeup mechanisms, but may be of any suitable form and are no part of the present invention so need not herein be shown or described further.

The support plates 35 on the opposite side of the machine from the drive transmissions 32 are connected together at their lower ends by a shaft 43, adjustable clamped to mounting blocks 44. Support legs 45 depend from the mounting blocks 44 and are mounted on the standards 22 as by nuts and bolts 46. The legs 45 have a plurality of apertures 47 extending therethrough, enabling the bag stacker to be tilted about the axis of the shaft 25 and held in position by the bolts 46 extending through selected of the apertures 47. A bearing support 48 is mounted on the outer side of each side plate 35 and form bearing supports for the drive shafts 28. The ends of the drive shafts 28 opposite the support legs 45 each extend through a housing 51 of the transmission 32 and are keyed or otherwise secured to the drive gearing of the transmission (not shown), to be driven therefrom.

The transmissions 32 are driven from a common drive shaft 52 and are slidably adjustable along said shaft toward and from each other, to accommodate adjustment of the conveyor chains 36 for various sizes of bags. The transmission 32 may be of any well-known form which may be adjusted along its drive shaft, and is preferably a type of transmission known to the trade as "TOL-O-MATIC."

The guide plates 35 are tied together at their upper ends by transverse shafts 53 at each side of the apparatus, extending through mounting blocks 55 bolted or otherwise secured to the outer faces of the guide plates 35 and extending outwardly therefrom. Setscrews 56 are provided to hold the guide plates 35 in preselected spaced relation relative to each other at their upper ends. The side plates 35 on each side of the machine are thus adjustable at their lower ends along the shaft 25 and at their upper ends along the shaft 53. The guide plates 35 on the opposite side of the machine are likewise spaced from each other by the shafts 53 and 43 and are adjustably moved along said shafts to enable the stacker to be adjusted for different size bags.

The conveyor chains 36 on each side of the machine have a series of equally spaced flights 57 extending horizontally therefrom on the downrunning run of the chains 36. The flights 57 are attached to the respective chains 36 by attachments 59. It may be seen from FIG. 2 that the flights 57 extend inwardly toward each other and the downrunning flights on one side of the machine register exactly with the facing downrunning flights on the opposite side of the machine to provide a movable platform, separable as the chains turn about the sprockets 33, to accommodate a stack of bags to fall onto the carry out conveyor 23.

The flights 57 may be made of fiber glass to provide high strength and low mass, to assist in getting the flights up to peak speed with a minimum drive torque. Said flights may, if desired, be perforated to cut down their weight and air resistance.

Facing side guides extend along each pair of endless chains 36 and include a center side guide 63, a front side guide 64 and a rear side guide 65. The side guides 63,64 and 65 are mounted on a pair of vertically spaced mounting bars 66 on opposite sides of slots 67,67 extending along said mounting bars. The slots 67,67 register with the chains 36 and provide a means along which the chains may move downwardly on their material carrying runs and traverse the flights 57 along the outsides of said guides. The center, front and rear side guides are mounted to the mounting bars 66,66 as by machine screws 69.

The front side guides 64 each have a flange 70 extending inwardly therefrom along an end of each of the associated mounting bars 66 and upwardly and downwardly of said mounting bars, for the length of said front guide. The rear guide 65 has a similar flange 71 formed integrally therewith extending parallel to the flange 70 and of the same length as the flange 70. The flange 70 has slots 73,73 extending therealong adjacent the upper and lower end portions of said flange. The flange 71 of the rear side guide has a pair of annular slots extending therealong in alignment with the slots 73,73. The slots 73,73 in the flange 70 and the aligned slots in the flange 71 extend through studs 74 extending inwardly of the side plates 35. The slots 73 and studs 74 afford a means for adjusting the side guides to converge from the upper to the lower ends thereof and dress the sides of a stack of articles as moving downwardly along said side guides as the stack of articles approach and enter the secondary holding area D, prior to delivery to the carry out conveyor 23. Lock nuts on the ends of the studs 74 or any other suitable holding means may hold the side guides in selected tilted positions.

Referring now to the drive means for the chains 36,36 and flights 57,57, the transmission 20 schematically shown in FIG. 6 includes a drive gear 76 detachable secured to the shaft 19. The gear 76 has diametrically opposed keyways 77,77, affording a means for keying said gear to said shaft to be driven therefrom. Smaller diameter drive gears 76a, 76b, 76c, 76d and 76e may replace the gear 76 when it is desired to increase the number of bags in each stack of bags.

The drive gear 76 is shown in FIG. 6 as meshing with an idler 79, which in turn meshes with a gear 80 rotatable about the axis of a shaft 81. A sprocket 82 coaxial with the shaft 81 is driven by the gear 80. The sprocket 82 meshes with and drives an endless chain 83, meshing with and driving a sprocket 84 on a shaft 85 forming the drive shaft for a Geneva drive mechanism 89. The sprocket 84 may abut a disk 86 having a hub 87 keyed or otherwise secured to the shaft 85. Release plungers 88, which may be in the form of spring pressed balls, are carried by the sprocket 84 and have driving engagement with the disk 86. The plungers 88, therefore, release the drive to the shaft 85 upon overload conditions of the stacker.

Figure 7:
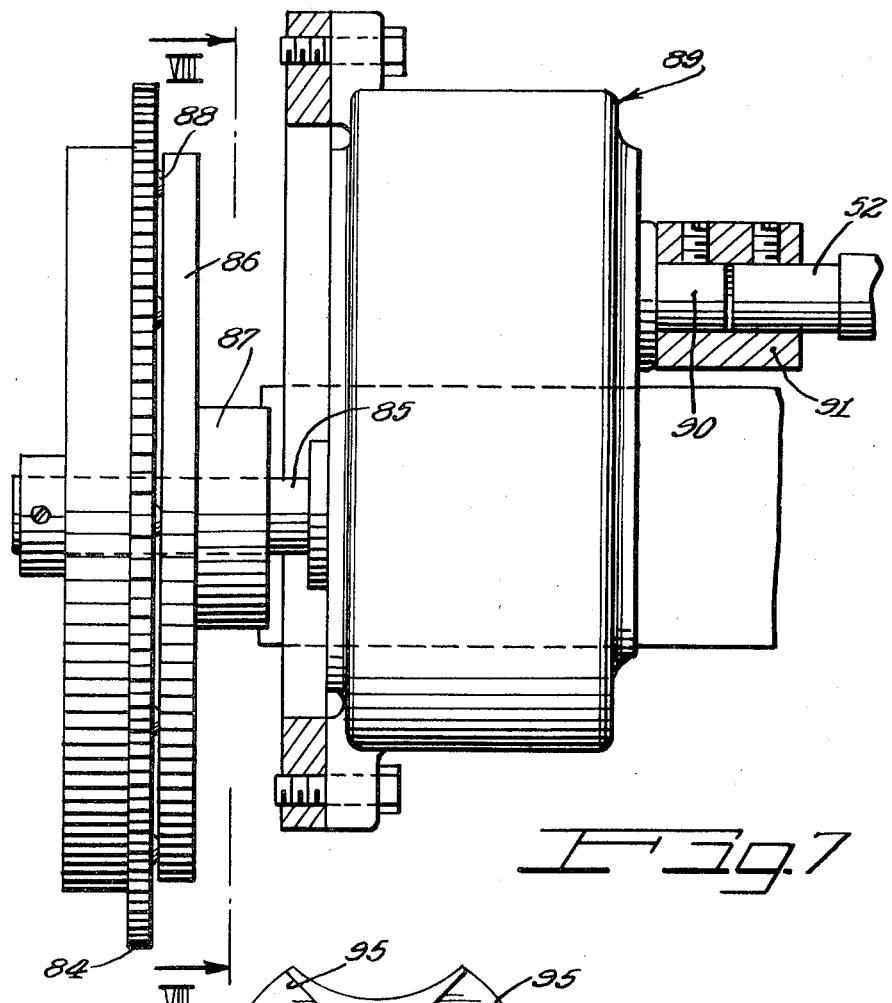
FIG. 7 is a fragmentary detail view showing certain details of the drive from the bag machine to the stacker not shown in FIG. 4.
Figure 8:
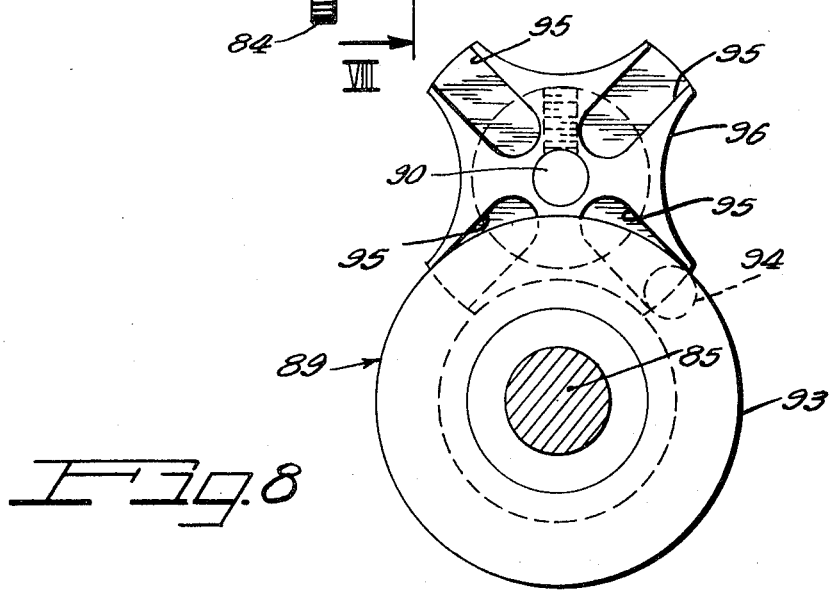
FIG. 8 is a fragmentary view diagrammatically illustrating the Geneva drive motion for driving the bag stacker.

The Geneva drive mechanism 89 has an output shaft 90, coaxial with the shaft 52 and driving said shaft through a coupling sleeve 91 (FIG. 7). The Geneva drive mechanism may be a type of drive mechanism manufactured and sold by Geneva Mechanisms Corp., Tampa, Florida and provides a drive cycle having 45° of acceleration, 45° of deceleration, and a rest period of 270°, at the end of the count or delivery of a preselected number of bags to the flights 57,57.

The Geneva mechanism 89 as diagrammatically shown in FIG. 7 includes a drive disk 93 on the shaft 85 and driven from said shaft. The drive disk 93 has a drive pin 94 extending from the face thereof for engagement with one of four equally spaced diametral slots 95 in a driven member secured to the drive shaft 90. As the drive pin 94 enters a slot 95 it will rotate the driven member 96 through an arc of 90°, with 45° of acceleration and 45° of deceleration, terminating as the drive pin leaves the slot 95. This will position the next succeeding slot 95 into position to be engaged by the drive pin 94 as said drive pin continues its cycle of rotation over an arc of 270°. The geneva drive mechanism thus drives the chains 36 and flights 57 to provide a period of acceleration in downward travel of the flights and then a period of deceleration terminating in a period of dwell. The length of the chains 36 is such as to provide two periods of dwell in travel of a pair of aligned flights 57 on their downrunning runs. A first period of dwell provides a primary collecting and holding area A for collecting and holding the bags prior to acceleration thereof. The second period of dwell provides a secondary holding and edge dressing area D where the edges of the stack of bags are dressed by the converging side guides 63,64 and 65 as the flights travel faster than the bags effecting a dripping of the bags as they approach the secondary holding area.

Referring now to the means for varying the count of bags stacked, the intermediate or idler gear 79 is journaled on a shaft 97 mounted for adjustment along a slot 99 in a support member 100 which may support opposite ends of said shaft. The slot 99 is of an arcuate form, struck from arcs the centers of which are the center of the shaft 81, to accommodate the gear 79 meshing with the gear 80 to mesh with the gear 76 and with any one of the gears 76a, 76b, 76c, 76d and 76e, to provide a series of progressively increasing speeds of the gear 80 and shaft 85 driving the Geneva drive mechanism 89.

The support member 100 may be mounted on the casing of the transmission in a suitable manner, and is no part of the present invention so need not herein be shown or described in detail. Suitable means may also be provided to hold the shaft 97 in a selected position with gear 79 meshing with the gear 80 and the gear 76 with the gear 80 and any selected gear 76a, 76b, 76c, 76d and 76e. It is apparent that the gear 76 is replaced by selected gears 76a to 76e inclusive when it is desired to increase the number of bags stacked. As for example, with the gearing proportion shown, when the gear 76 is mounted on the shaft 19, the speed of the conveyor chains 36,36 and flights 57,57 will be such as to deliver two bags to the bag stacker and stack the bags in stacks of two. Usually large, heavy bags only are so stacked. The interchanging of the gears 76a for the gear 76 will increase the speed of downward travel of the conveyor chains 36 and flights 57 and the press and delivery drum 13 and deliver four bags to the stacker just above the first collecting and holding area and stack the bags in groups of four.

The substitution of the gear 76b will effect stacks of five bags each. The gear 76c will effect stacks of six bags each. The gear 76d will effect stacks of ten bags, while the gear 76e will effect the stacking of 12 bags in each stack and give the maximum speed possible with the gear trains shown.

In operation of the apparatus, individual bags are fed by the press and delivery drum 13 as delivered from the bag machine, into an area disposed above the primary collecting and holding area at a level where the flights 57,57 are accelerating to their peak velocity.

Since the action time of downward travel of the flights is only one-fourth of the total cycle time and is broken up into 45° of acceleration and 45° of deceleration, the peak velocity of the flights is very high. The bags at in the primary collecting and holding area stay with the flights during the initial period of acceleration. The flights then move away from the bags as they reach their peak velocity and the bags then again catch up with the flights at the end of the lowering cycle. This action aids in dressing the bags as they lower. The primary collecting and holding area will thus be established by a dwell in travel of the flights of 270° after deceleration thereof, to enable consolidation of the stack.

As the flights again accelerate to the secondary holding and edge dressing area when moving downwardly, they will stay in contact with the bags during the period of initial acceleration thereof and will then run away from the stack of bags and never touch the bags until deceleration of the flights in the secondary holding area. During lowering to the secondary holding area, the guides 63,64 and 65 being inclined to converge toward their lower ends, will dress the edges of the stack and during acceleration of the flight from the secondary holding area, the flights as approaching their peak acceleration will then run away from the stack of bags and turn about the drive sprockets 33,33. The bags will then be free to fall to the carry out conveyor 23.

The secondary holding area thus lets the stack of bags settle into a solid mass for dropping onto the carry out conveyor, and provides an area assuring that as the last bag is dropped from the primary collecting and holding area it will be in direct contact with the stack it belongs to and as it approaches the stack will settle on the top bag of the stack without the building up of partial air pressure between its bottom side and the top side of the stack, and thereby avoiding flutter, gliding, tipping and lack of control of the last bag, as the stack of bags lands on the carry out conveyor 23.

The secondary holding area D thus gives the top bag ample time to settle down on the top of the stack of bags, letting the air interface bleed out, so the stack of bags is like one solid mass. When this mass of bags is dropped from the secondary holding area to the carry out conveyor, it remains as one mass of bags and does not separate during the fall to the carry out conveyor, because as the tendency to separate appears, a partial vacuum between the bags is created, which prevents separation thereof. The short distance of the fall from the secondary holding area to the carry out conveyor and the short time of the fall prevents the vacuum from being broken and thereby prevents the bags from separating from the mass of bags.

The carry out conveyor 23 is continuously driven at a slow constant rate of speed to carry out the stack of bags and to avoid shingling of the stack of bags as the stack drops onto the carry out conveyor.

It should here be understood that while it is of a distinct advantage to have primary and secondary holding areas, in applications where space does not permit a two station drop, the secondary holding area may be dispensed with, and while there may be a sacrifice in uniformity of the edge dressing of the stack, the principles of the invention may be effectively carried out for many articles being stacked, without the need for both the primary and secondary holding areas.

I claim as my invention:

1. In an apparatus particularly adapted for stacking flat articles,
    an elevated loading area,
    a lower article collecting and holding area,
    a bottom carry out station for stacked articles, vertically aligned with said loading and holding areas,
    vertical guides defining the sides of said loading and holding areas and converging toward each other as they extend downwardly from the elevated loading area toward the lower article collecting and holding area and serving to dress the edges of the stack as traveling downwardly along said guides,
    vertically spaced article supporting flights extending inwardly of said guides toward each other and movable downwardly along said guides in timed relation with respect to each other,
    drive means for said flights, driving said flights to move downwardly along said guides,
    said drive means including an accelerating intermittent drive mechanism moving the flights downwardly from said loading station to said collecting and holding area at accelerating and decelerating speeds, to effect travel of said flights at higher rates of speed than the speed of the articles deposited thereon as they approach said collecting and holding area, and then decelerating to enable the articles to catch up with the stack, and placing a substantial dwell in downward travel of said flights at the end of the period of deceleration, and thereby establishing said collecting and holding area, and said flights moving away from the flat articles as they approach said carry out station, to deposit the flat articles thereon in a uniform stack.

2. The bag stacker of claim 1, in which the means driving the flights to move downwardly along the guides, include endless chains having vertical conveying runs movable downwardly along said guides and return runs spaced outwardly of said guides, and drive and idler sprockets for said chains driving and guiding said chains to move in orbital paths downwardly along said guides.

3. The bag stacker of claim 2, in which a Geneva drive mechanism is provided for driving said drive sprockets and moving said flights downwardly at accelerating rates of speed for a short portion of downward movement of said chains and flights, at decelerating rates of speed for a further portion of downward travel of said chains and flights, with a dwell between the decelerating and accelerating portions of the cycle and extending for a greater portion of the driving cycle of said sprockets.

4. The bag stacker of claim 3, in which the vertical side guides converge from the tops to the bottoms thereof to dress the edges of the stack of flat articles as traveling to the carry out station.

5. The bag stacker of claim 1,
    wherein the collecting and holding area is a primary collecting and holding area,
    wherein a secondary holding area is disposed beneath said primary holding area and is defined by a dwell in downward travel of said flights as said flights progress a preselected distance beneath said primary holding area, and
    wherein the flights move angularly outwardly and downwardly away from the stacked articles during acceleration of said flights, to deliver the stacked articles onto said carry out station.

6. The bag stacker of claim 5, in which vertical side guides converge from the primary holding area toward the secondary holding area and serve to dress the edge of the stack as it drops to said secondary holding area.

7. The bag stacker of claim 5, in which the means moving the flights downwardly along the guides comprise endless chain guided for movement downwardly along said guides,
   drive and idler sprockets for each of said chains and changing the directions of said chains to move upwardly on the return runs thereof along the outsides of said guides, and
   wherein the means for driving said sprockets comprises a Geneva drive connection having driving connection with each of said drive sprockets for driving said sprockets at the same rates of speed.

8. The bag stacker of claim 7, in which the vertical guides converge toward each other from the loading station to the secondary holding area to dress the edges of the stacked articles as dropping to the secondary holding area.

9. The bag stacker of claim 8, in which means are provided accommodating the endless chains, sprockets and guides to be adjustably movable toward and from each other, to accommodate the stacker for various widths of articles.

10. The bag stacker of claim 7, including pivotal support means for the stacker, mounting the stacker for adjustable movement about axis extending transversely of the axes of said drive and idler sprockets and disposed beneath said endless chains, and other means holding said bag stacker in selected positions of adjustment.

* * * * *